Feb. 19, 1946.　　F. L. WHITE ET AL　　2,395,239
PRESSURE FLUID CLUTCH
Filed Sept. 28, 1943
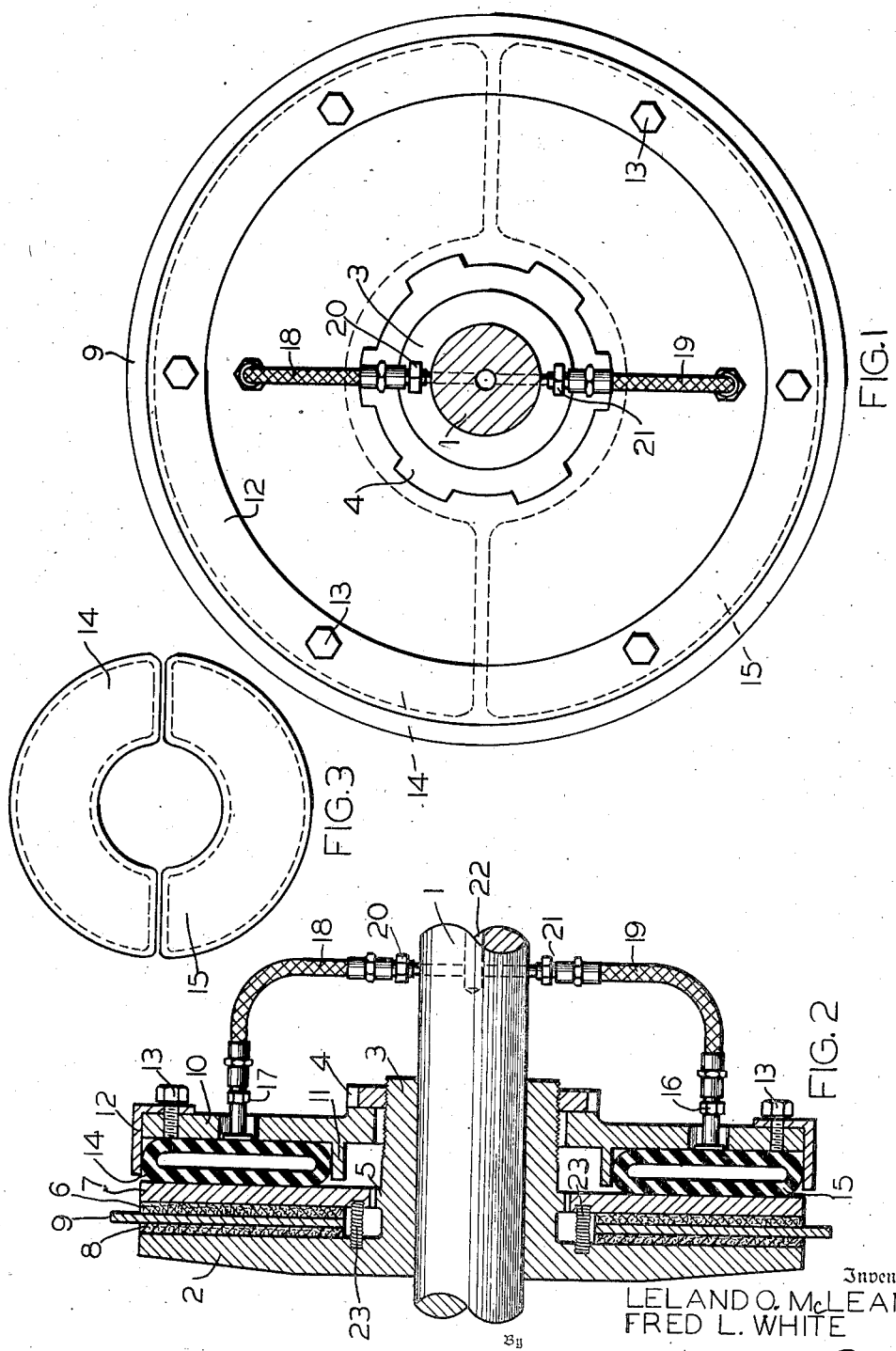
Inventor
LELAND O. McLEAN
FRED L. WHITE
By Alfred F. Dees
Attorney Patented Feb. 19, 1946

2,395,239

UNITED STATES PATENT OFFICE 2,395,239

PRESSURE FLUID CLUTCH

Fred L. White and Leland O. McLean, Marion, Ohio, assignors to The Osgood Company, Marion, Ohio, a corporation of Ohio Application September 28, 1943, Serial No. 504,194

14 Claims. (Cl. 192—88)

This invention relates to pressure fluid operated clutches and in its more specific aspects is directed to two part expandable or inflatable element for the clutch of a portable hoist or excavator, which clutch can be dismantled in situ.

The object of this invention is to provide a pressure fluid operated clutch for the winch or winding drum drive shaft of a portable excavator or hoist having an inflatable element enabling the repair, inspection or removal of the inflatable element without the removal of the clutch unit from the drive shaft.

A further object of the invention is to provide an inflatable element for a pressure fluid operated clutch composed of a plurality of individual elements formed as segments of a cylinder or circle.

Another object of the invention is the provision of a pressure fluid operated clutch in which the pressure may be applied to a plurality of inflatable elements to control the power transmitted.

A still further object of the invention is to provide a pressure fluid operated clutch in which the normally rigid parts are separable and from between which a plurality of inflatable elements interposed therebetween are removable in situ.

Other and further objects of the invention are to provide a clutch particularly applicable to the relatively inaccessible winch or winding drum drive shaft of a portable hoist or excavator which employs a minimum number of parts and a plurality of inflatable elements interposed between some of the parts and arranged in the form of a cylinder to thereby apply a uniform pressure on the relatively movable parts bearing the clutch faces and which inflatable elements are removable in situ without dismantling the hoist or excavator.

Other and further objects of the invention will occur to those skilled in the arts to which this invention pertains as the description proceeds which taken in connection with the accompanying drawing sets forth a preferred embodiment thereof but such disclosure is not to be construed as a limitation of the invention which is limited only by the appended claims and any and all variations, modifications and alterations of structure coming within the spirit and scope thereof are deemed to be included herein.

In the drawing:

Fig. 1 shows an end elevational view of the clutch.

Fig. 2 shows a vertical section view of the clutch.

Fig. 3 shows an end view of the inflatable elements of the clutch.

Prior art clutch constructions for the drive shafts supplying power to the several hoisting winches, winding drums and for the several driven and movable elements of a portable hoist or excavator have in the past been of the familiar multiple disc type or cone type of clutch. One of the disadvantages of these structures is their inability to start smoothly and easily under all conditions. The expected "life" of these clutches for the rough use given them is comparatively short. One feature of these clutches in their favor is comparative ease of repair and inspection. They do not require a great deal of time to fit in place the several parts. The comparatively short life of the cone or disc type clutch becomes troublesome and because of the character of service imposed has only accentuated those disadvantages. The shafts on which the clutch parts are assembled are for the most part relatively inaccessible and therefore serious consideration must be given to any different forms of clutches proposed for use.

Various types of pressure fluid clutches have been devised and while possessed of the very operating characteristics desired have the very serious disadvantage of requiring the excavator to be dismantled to effect adjustments, repairs or replacements of the inflatable element. The time consumed for such routine work in monetary cost far exceeds the value of the parts repaired, replaced etc.; therefore an uneconomical expedient in spite of its highly desirable operating characteristics.

The subject matter of the instant invention combines ease of the servicing characteristics of the cone or disc clutch with the pressure fluid operated clutch which still has all of the smooth, positive and even power transmitting characteristics of the straight pressure fluid operated clutch. The resulting structure invented can be repaired, have vital parts replaced in situ, and inspected without dismantling the machine to gain access to the clutch parts. These several features and the structure to obtain them are set forth in the drawing and subsequently described in greater detail.

The clutch is mounted on a shaft 1 to which is secured a driving clutch element 2, secured to shaft 1 in any convenient manner. The driving element has an extended hub 3 that is threaded at one end on which a nut 4 is threaded. Near the middle of the hub 3 an integral collar 5, whose periphery is splined, is formed, which splines engage with the splined center of an axially movable or floating clutch element 7, the splined center of which engages with the splined collar 5.

One side of the floating element 7 is lined with a clutch facing 6 and the opposite face of the driving element 2 is likewise lined with a clutch facing 8 similar in texture to that of facing or lining 6. Disposed between the driving element 2 and floating element 7 and their attached linings 6 and 8 is a driven element 9. This element takes the form of a relatively thin disc and by reason of the large surface considerable amounts of power may be transmitted.

The clutch is provided with a relatively fixed front or forward plate 10 held in place on the hub 3 by the nut 4. The plate 10 is provided with an internal integral collar 11 and at its periphery a circular flanged element 12 is secured to the plate 10 by a plurality of screws 13.

The axially extending portion of the flange 12 and the collar 11 combine to form a channel or chamber in which are arranged two semi-circular or segmental inflatable elements 14 and 15 formed of some elastic material such as rubber or the like. The inflatable unit may comprise 1, 2, 3 or more segments at the election of the operator. Each of these inflatable elements is provided with a fitting 16 and 17 for the purpose of admitting pressure fluid to each of the elements. Fittings 20 and 21 are arranged in shaft 1 that lead to a concentric bore 22 that is connected to an appropriate source of pressure fluid supply. Hose connections 18 and 19 extend between the several fittings 17, 20 and 16, 21 respectively to conduct pressure fluid to the several inflatable elements 14 and 15. Upon the inflation of the two elements 14 and 15 floating member 7 is urged against driven member 9 and it against driving member 2, member 7 also being a driving member. Upon release of pressure fluid from inflatable elements 14 and 15, springs 23 will separate elements 7, 8 and 9 allowing driven element 9 to come to rest.

The varying of pressure in the inflatable or expansion elements 14 and 15, is the expedient whereby the amount of power transmitted by the clutch can be controlled. The unit may also be used as a brake by using the shaft 1 as a stationary torque shaft or by using the housing or ring which is in contact with the disc 9 as a stationary torque unit. The width of the inflatable elements 14 and 15 may be varied to apply varying amounts of pressure on the floating element 7. The total pressure will vary in direct proportion to the area of the element.

From the foregoing description it will be seen that this clutch is a self adjusting, compact, power transmitting device, allowing a wide variation of pressures and thus a wide range of power transmission. There are no joints, pins or wearing points, hence no lost motion and the clutch may be adjusted for wear on the linings 6 and 8 by means of the nut 4. The inflatable or expansion elements, being made in two or more parts, are easily removable in the event of failure from any cause and may be changed without disturbing the location of the clutch or any other parts on the shaft 1 or removing the shaft from its bearings. There is no relative motion between the inflatable elements and the plates which they contact, and thus no wear is present. The face of the floating plate 7 may be covered with asbestos or other heat resisting material to prevent the transmission of heat to the inflatable elements. At every operation of the clutch a fresh supply of pressure fluid enters the inflatable elements and upon release is discharged and this action assists in keeping the several elements cool.

That which is regarded new, novel and useful and which is sought to be protected by Letters Patent of the United States is as follows:

1. In a pressure fluid operated clutch; a shaft; a driving element mounted thereon provided with an extended hub; a splined collar on said hub; said driving element including a disc-like element and a floating element splined to said collar spaced from and rotatable with said disc-like element; a driven element disposed between the disc-like and floating elements of said driving element; a front plate fixed to said hub provided with a concentric collar on one side; a removable flange secured to said plate having one leg of said flange extending parallel to and radially from said collar; a pair of segmental inflatable elements disposed in the chamber formed by said flange and said collar; means to admit pressure fluid to said inflatable elements; and said elements upon inflation urging said floating element into engagement with said driven element to thereby drive said driven element, said inflatable elements being removable upon removal of said flange.

2. In a pressure fluid operated clutch; a shaft, a driving element mounted on said shaft which comprises a disc-like element secured to an extended hub; a floating element splined to said hub; a driven element disposed between said disc and said floating element; a plate secured to said hub; said plate having a concentric collar thereon; a removable flange secured to the periphery of said plate and forming with said collar an enclosed chamber; a plurality of inflatable elements in said chamber; and means to admit pressure fluid to each inflatable element; said inflatable elements being removable from the said chamber upon removal of said flange.

3. In a pressure fluid operated clutch; a shaft; a disc-like element having an extended hub fixed to said shaft; a floating element disposed on said hub and adapted to rotate therewith; a driven element operatively associated with said disc-like and said floating elements; a plate element secured to said hub; a removable flange secured to the periphery of said plate; a plurality of inflatable elements disposed between said floating element and said plate; means to admit pressure fluid to each of said inflatable elements; said elements upon inflation urging said floating element into engagement with said driven element and it into engagement with said disc-like element to rotate said driven element; said flange holding said inflatable elements in position between said plate and said floating element; and said inflatable elements being removable from the clutch upon the removal of said flange.

4. In a pressure fluid operated clutch; a driving element provided with an extended hub; a floating element rotatable with said hub and movable axially of said hub toward and away from said driving element; a driven member disposed between said driving element and said floating element; a plate element fixed to said hub; a plurality of removable inflatable elements disposed between said plate and said floating element, said elements upon inflation bringing into engagement said driving element and said floating element with said driven element; means to admit pressure fluid to each of said inflatable elements; and a removable element secured to said plate to retain said inflatable elements in position between said plate and said floating element.

5. In a pressure fluid operated clutch; a disc-like driving element having an extended hub; a floating element driven in unison with said driving element and disposed upon said hub; a driven element operatively associated with said disc-like element and said floating element; means to bring said disc-like element, said floating element and said driven element into operative engagement which includes a plurality of removable inflatable elements radially disposed of said hub, and a plate fixed to said hub adapted to absorb axial thrust of said inflatable elements and to cause said thrust to be imposed on said floating element; means to admit pressure fluid to each of said inflatable elements; and a removable flange secured to said plate to retain said inflatable elements in position in the clutch.

6. In a pressure fluid operated clutch; a driving element which includes a disc-like element and a floating element associated with a hub on said driving element; a driven element; means to bring said disc-like and floating elements into engagement with said driven element which includes a plate secured to said hub and a plurality of removable inflatable elements disposed between said floating element and said plate; means to admit pressure fluid to each of said inflatable elements; and a removable flange enclosing the space between said plate and said floating element to hold said inflatable elements in position.

7. In a pressure fluid operated clutch; a driving element provided with an extended hub; a floating element splined to and adapted to move axially of said hub toward and away from said driving element; a driven member disposed between said driving elements and said floating element; a plate element secured to said hub; a removable inflatable element disposed between said plate element and said floating element, said element upon inflation bringing said driving element, said driven member and said floating element into engagement; means to admit pressure fluid to said inflatable element; and a removable element secured to the periphery of said plate to retain said inflatable element in position between said floating element and said plate element.

8. In a pressure fluid operated clutch; a disc-like driving element provided with an extended hub; a floating element splined to said hub and driven in unison with said disc-like element; a driven element mounted for engagement with said disc-like element and said floating element; means to urge said driven element into engagement with said disc-like element, and said floating element which includes a plurality of removable segmental inflatable elements arranged along side of said floating element and a plate element secured to said hub, said inflatable elements upon inflation axially moving said floating member along said hub to firmly engage said disc-like floating and driven elements; means to admit pressure fluid to each of said inflatable elements; and a removable flange secured to said plate to retain said inflatable elements in position.

9. In a pressure fluid operated clutch; a disc-like driving element having an extended hub; a floating element on said hub adapted to be rotatable therewith; a driven element disposed between said floating element and said driving element; a plate removably secured to said hub; a plurality of inflatable elements disposed between said plate and said floating element; means to admit pressure fluid to each of said inflatable elements which upon inflation move said driving element, said floating element and said driven element into engagement; and means to keep said inflatable elements in position which includes a concentric collar fixed to said plate and a removable flange secured to the periphery of said plate, said plate and collar forming a chamber in which said inflatable elements are placed, said flange upon removal permitting removal of said inflatable elements.

10. In a device as defined in claim 9 which includes, means to disengage said driven and driving elements upon deflation of said inflatable elements.

11. In a pressure fluid operated clutch; a shaft; a driving element on said shaft having two disc-like elements one of which is capable of moving relatively axially of the other; a driven element operatively associated with said disc-like elements; means to bring each of said disc-like elements into operative engagement with said driven element which includes a plurality of removable inflatable means concentrically disposed with respect to said shaft constructed and arranged to be removable as a unit from said clutch; means to admit pressure fluid to said inflatable means including a bore in said shaft; and means to hold said inflatable means in an operative position with respect to said disc-like and said driven elements.

12. In a pressure fluid operated clutch; a shaft; a driving element secured to said shaft; a driven element operatively associated with said driving element and normally disengaged therefrom; means to bring said driving and said driven elements into engagement with each other which includes a plurality of removable inflatable means concentrically disposed about said shaft and constructed and arranged as to be removable as a unit from said clutch; means associated with said driving element to hold said inflatable means in said clutch such that said inflatable means upon inflation will urge said driving and driven elements into engagement with each other, and means to admit pressure fluid to said inflatable means derived from a duct in said shaft.

13. In a pressure fluid operated means; a shaft, a driving element on said shaft; a driven element; a plurality of inflatable means concentrically disposed about said shaft in operative relation to said driving and driven elements to urge said driving and driven elements into engagement with each other, said inflatable means constructed and arranged to be removed as a complete unit from said clutch; means to admit pressure fluid to said inflatable means connected to a bore in said shaft; and means associated with said driving element to hold said inflatable means in operative relation to said driving and driven elements.

14. In a device as set forth in claim 13, in which said means to hold said inflatable means in operative relation to said driving and driven elements includes a member having walls therein forming a recess for holding said inflatable means and in which one wall forming said recess is removable to enable said inflatable means to be removed as a complete unit.

FRED L. WHITE.
LELAND O. McLEAN.